Aug. 26, 1958 W. A. PROELL ET AL 2,848,872
TURBOJET STARTER CARTRIDGE CASE
Filed Nov. 25, 1955 2 Sheets-Sheet 1
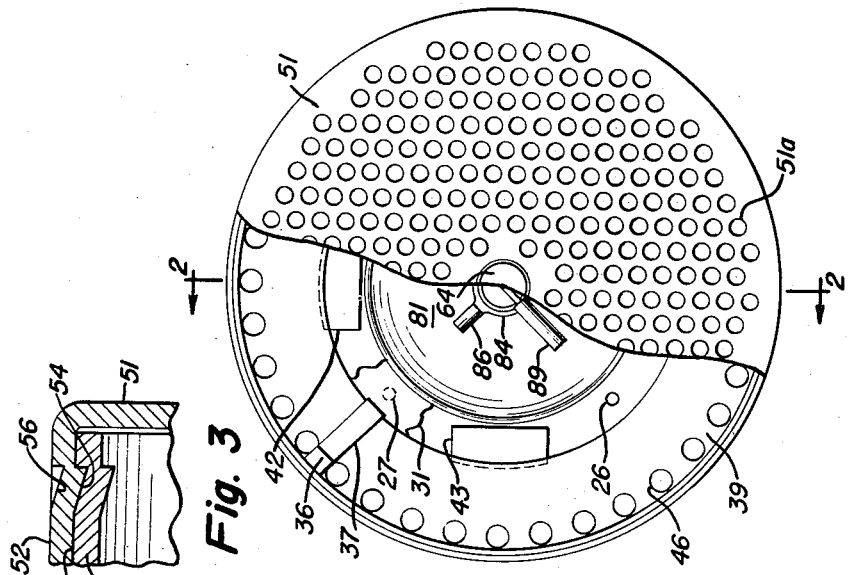
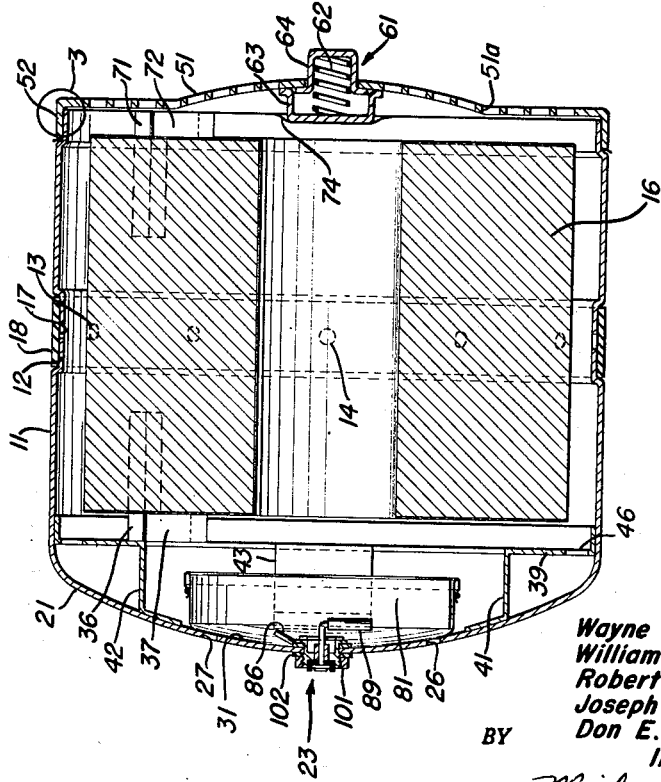
Wayne A. Proell
William G. Stanley
Robert H. Ossyra
Joseph F. Dominik
Don E. Kennedy
INVENTORS.
BY Michael Dufnery
ATTORNEY Aug. 26, 1958
W. A. PROELL ET AL
2,848,872
TURBOJET STARTER CARTRIDGE CASE
Filed Nov. 25, 1955
2 Sheets-Sheet 2
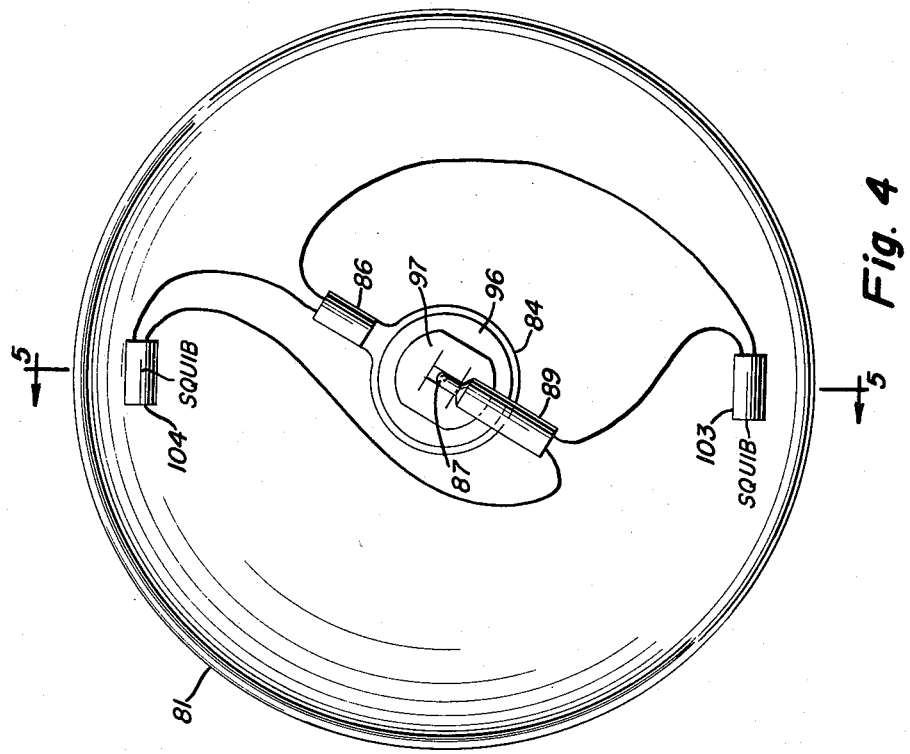
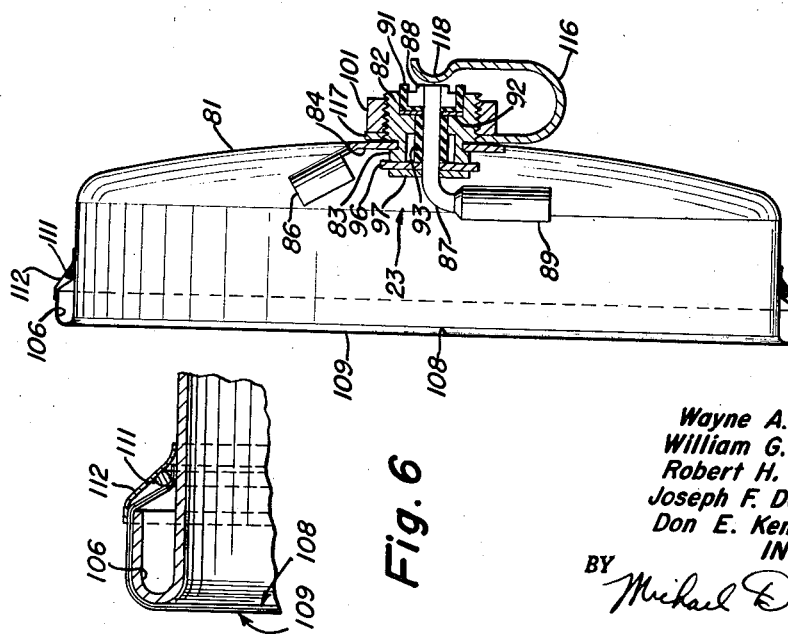
Wayne A. Proell
William G. Stanley
Robert H. Ossyra
Joseph F. Dominik
Don E. Kennedy
INVENTORS.
BY Michael Dufmery
ATTORNEY United States Patent Office 2,848,872
Patented Aug. 26, 1958

2,848,872

TURBOJET STARTER CARTRIDGE CASE

Wayne A. Proell, Chicago, Ill., William G. Stanley, Munster, Ind., Don E. Kennedy, Park Forest, Ill., and Joseph F. Dominik, Hammond, and Robert H. Ossyra, Seymour, Ind., assignors to Standard Oil Company, Chicago, Ill., a corporation of Indiana Application November 25, 1955, Serial No. 548,973

7 Claims. (Cl. 60—39.47)

This invention is concerned with the starting of turbojet engines. More particularly the invention is concerned with the cartridge case utilized in a gas-driven turbojet starter.

At present, turbojet engines are started by several different techniques. One of the simplest techniques now used involves an auxiliary engine, called a turbojet starter, which auxiliary engine or starter turns over the main turbojet rotor and brings it up to the desired rotational speed before the injection of the fuel into the combustors. This turbojet starter comprises a gas-driven turbine which is connected, through gearing, to a clutch and the entire assembly is then mounted on the frame of and coupled to the shaft of the main turbojet rotor. The gas for driving the starter turbine is derived from the combustion of a solid propellant. The solid propellant is burned in a chamber which is mounted integrally as a part of the starter. This chamber is formed to receive the starter cartridge and is designed to be opened and closed manually. The chamber is divided at about its mid-portion into a lower section and an upper section; the two portions are locked together by an ordinary slip joint, which slip joint is not gas tight. This type of sealing means is used rather than a gas type screw thread in order to permit manual operation without the use of tools.

The solid propellant, whose combustion produces the gases that turn over the starter turbine, is contained in a cartridge case which is designed to fit into the starter chamber. The starter cartridge case must perform several important functions. From the design of the chamber, it is self-evident that the starter cartridge case must seal the sliding joint connection between the upper and lower portions of the chamber and prevent gas leakage outside the chamber, thereby utilizing all the gases produced for the turning over of the starter turbine.

The propellant is ignited by electrical squibs; Therefore, it is necessary that the cartridge case have provisions for electrical actuation of the squibs from outside the starter chamber.

A solid propellant must be protected during transportation and common rough handling and even dropping during loading operations. As the turbojet planes operate over the entire surface of the earth, where the storage temperature may range from −75° F. to +170° F. or more, it is necessary that the solid propellant be given adequate protection over this entire range of atmospheric temperatures. Thus the starter cartridge case must provide protection for the solid propellant and also for the ignition means during transportation, storage and handling of the aircraft over this wide range of atmospheric temperatures.

Particularly in extreme cold, men are awkard and it is not uncommon that the turbojet starter cartridge is dropped a distance of several feet in the process of loading a starter chamber. It is extremely desirable that the dropped cartridge be so constructed that it can be picked up and inserted into the starter chamber instead of being discarded for fear of malfunction. The starter cartridge case must not only protect the solid propellant and the igniter during such a fall, but it in itself must not be deformed by a fall to an extent that it will not fit into the starter chamber. It is self-evident that the electrical connections which permit ignition of the igniter and the solid propellant must also withstand dropping of the cartridge a distance of some feet at atmospheric temperatures.

In addition to these stringent operational requirements, it is desirable that the cartridge case, which is defined as the starter cartridge excluding the solid propellant grain and the igniter material, be reasonably cheap to make.

An object of this invention is a cartridge case suitable for use in the auxiliary gas-driven starter for turbojet engines. A particular object is a cheap, easily made cartridge case for gas-driven auxiliary starters for turbojet engines. Another particular object is an igniter assembly for use as a component of the cartridge case utilizable in turbojet starters. Other objects will become apparent in the course of the detailed description of the invention.

The cartridge case of the invention is described in detail in connection with the annexed figures which form a part of this specification.

Figure 1 shows a plan view, and partial interior view, of the cartridge case of the invention.

Figure 2 shows a sectional view along the line 2—2 of Figure 1 of the cartridge case of the invention including the solid propellant. (The solid propellant does not appear in Figure 1.)

Figure 3 shows in enlarged view, the means by which the screen plate is fastened to the body portion of the cartridge as shown at circle 3 of Figure 2.

Figure 4 shows the igniter assembly capable of use in the starter cartridge case of the invention.

Figure 5 shows a section along the line 5—5 of Figure 4 of the igniter assembly with the electrical squibs deleted.

Figure 6 shows an enlarged detail of one portion of igniter assembly of Figure 5.

In Figure 2, a thin-walled tubular body portion 11 is provided with a shallow groove 12. The tubular body portion may also be described as a cylinder. The wall of body portion 11 is made thick enough to withstand the handling requirements of turbojet starter cartridges. It is obvious that the thickness of the wall will be dependent upon the type of material used. It has been found that with ordinary mild steel material of construction sheet of 16 or 20 gauge is of sufficient strength. Groove 12 is positioned at about the mid-point of body portion 11 and runs around the entire periphery of the body portion. The depth of the groove 12 is such that the means for sealing the slide joint of the starter chamber will fit into the groove so as to provide a substantially flush surface with respect to the exterior side of the tubular body portion wall. It is to be understood that the sealing means need not be exactly flush with the outside wall as the cartridge case is not a sliding fit into the starter chamber.

Postioned in groove 12 are a plurality of apertures 13, 14, etc. These apertures are substantially uniformly spaced about the periphery of body portion 11. The function of apertures 13, etc. is to permit gas produced from the combustion of the solid propellant grain 16 to pass through the wall of the case and exert pressure on the sealing means. Apertures 13, etc. may be small holes, for example one-eighth inch in diameter or they may be slots. The apertures 13, etc. are relatively small with respect to the width of groove 12. The apertures 13, etc. are substantially uniformly spaced around the periphery of the body portion 11 in order to insure sealing of the entire joint surrounding the case, the joint in the starter cartridge being located immediately adjacent the groove 12 provided in body portion 11. It has been found that a plurality of apertures are necessary in order to provide good sealing, the exact number of apertures being a function of the aperture size. Too large a number of apertures or too large a size relative to the width of groove 12 may cause destruction of the sealing means and permit leakage of gases out of the chamber by way of the joint. The exact number of apertures 13 and the size thereof may be readily determined by a small number of tests for each type of sealing means.

The cartridge must not be damaged by the entrance of moisture into the interior of the case. Moisture interferes with the proper burning of the solid propellant. The apertures 13, etc. are covered with a moisture-impervious film 17 which extends around the periphery of the body portion in groove 12. The moisture-impervious film 17 need not be impervious in the precise sense of that word. Hereinafter moisture-impervious is to be understood as a material which will prevent water entering the film of the particular thickness being used for a time substantially in excess of the specification requirement of "no moisture penetration after 2 hours exposure to a driving rain."

This moisture imperviousness is tested by placing the cartridge case under a shower head running ambient temperature water for a period of 2 hours. The moisture-impervious film 17 may be obtained by coating the groove with a viscous material which dries to form a film or it may be obtained by the use of one of the numerous self-sticking tapes now available commercially. Drafting tape is particularly suitable for this purpose. It has been found that the presence of the film completely around the shallow groove has a beneficial effect on the effectiveness of the elastic sealing member positioned in the groove. Apparently the moisture-impervious film 17 carbonizes during the combustion of the propellant and forms an insulating layer between the hot metal case and the sealing member. The moisture-impervious film may be positioned in the groove 12 on the outside wall of the body portion 11 or may be positioned inside the case.

The means for sealing the joint of the chamber is an elastic ribbon-like member 18 positioned in groove 12 and extending over apertures 13, etc. provided in the groove of body portion 11. Member 18, which may be described as a rubber-like elastic band, extends over apertures 13, etc. an appreciable distance. Gases from the combustion of solid propellant grain 16 break through the film 17 at apertures 13, etc. and exert pressure against band 18, expanding it against the joint in the starter chamber. It is preferred that band 18 be about the width and depth of groove 12. Band 18 may be any material which is sufficiently elastic to be expanded the distance between the outside wall of groove 12 and the surface of the starter chamber to seal the joint in the chamber. The elastic member or band 18 may be made of various synthetic materials, such as polyethylene or polyvinylacetate which has been plasticized to render it elastic. It is preferred that band 18 be rubber-like in characteristics and made from natural or synthetic rubbers. Because of its resistance to temperature, silicone rubber is preferred as a material of construction for rubber-like member 18.

As a general statement, the moisture-impervious films utilized at various points in the cartridge case and also the elastic ribbon-like member 18 are preferably made of materials which do not contain chlorine. It is believed that the presence of halogens in the gases entering the turbine of the starter have a deleterious effect on the operation and life of the starter.

There is attached to one end of body portion 11 a thin-walled end-closure means 21. End-closure means 21 may be fabricated integrally with body portion 11 or may be attached thereto by welding or by nuts and bolts or by rivets. It is desired that end-closure member 21 be substantially rigidly attached to body portion 11. It is preferred that end-closure means 21 be made of the same material of construction as is body portion 11. However, it is possible that for reasons of strength when end-closure means 21 and body portion 11 are not made integrally that a different thickness of material may be used in each portion of these two items. It has been found that mild steel sheet of 16 gauge thickness is more than adequate for use in end-closure means 21.

End-closure 21 is adapted for the mounting of igniter assembly herein designated as numeral 23. Usually end-closure 21 will be provided with a hole which is centrally located with respect to the long axis of body portion 11 into which the igniter assembly is mounted by means hereinafter described.

End-closure means 21 is provided with a plurality of apertures 26, 27, etc. These apertures 26, etc. are positioned on the end-closure so as to permit free flow of gases from the interior of the case through the apertures. The presence of combustion gas on the exterior of the end-closure and of the case has some beneficial effect on the operation of the starter, the number of apertures 26, etc. to be determined by the size of the aperture and also by the solid propellant itself. In general, 3 or 4 one-eighth inch apertures appears to be sufficient. These apertures 26, etc. should be placed uniformly on the end-closure about the central point thereof.

To exclude moisture from the interior of the case, apertures 26, etc. are covered by moisture-impervious film means. Aperture 27 in Figure 1 is shown covered by moisture-impervious film means 31. The film means used to cover apertures 26, etc. may be of the same material of construction as the film means 17 used to cover apertures 13, etc. In this embodiment, film means 31 is shown positioned on the interior wall of end-closure means 21. However, the moisture-impervious film means may be positioned either on the interior wall or on the exterior wall, the exact location being determined in part by the material used and also the mode of construction of the case itself.

Solid propellant grain 16 is, in this embodiment, a tube. A gas flow passage must be provided along the interior wall of tubular portion 11. The outside diameter of grain 16 is set relative to the internal diameter of body portion 11 so that the necessary predetermined spacing for the flow of gases at the initial combustion is set. Grain 16 is cushioned against handling by means of resilient members positioned both on the cylindrical sides of the grain and also on the flat bottom and top sides. In this embodiment, four resilient side members and end members are utilized at each end of the grain to provide this support. In Figure 1, upper resilient side member 36 and lower resilient side member 37 are shown, the number of resilient members to be determined in part by the type of solid propellant used and also the material of construction of the resilient members themselves. However, it is preferred that the resilient members be made of materials such as felt, rubber, or cork. Felt is a particularly good material. The resilient side members are adapted to maintain a predetermined spacing between the interior side of the body portion wall and the exterior of the grain 16; or this may be described as a predetermined spacing between the interior of the body portion 11 and the inner surface of the side member since the inner surface of the side member must be in contact with the outer surface of the grain. The upper resilient side members are supported near the end-closure means.

Lower resilient end-members 37, etc. are supported near end-closure means 21 and are adapted to maintain a predetermined spacing between the inner side of the end-closure wall and the inner surface of the upper end member, i. e., the upper end of grain 16. In this embodiment, the lower side member and lower end member 36 and 37 respectively are formed out of one L-shaped piece of resilient material and are mounted against the inner wall of tubular portion 11. The upper members are supported by means of an apertured doughnut plate 39 which is spaced from the end-closure by means of legs 41, 42, 43. These legs are spot-welded to the inner surface of end-closure 21. Also, the flat portion of plate 39 is spot-welded to the inner wall of body portion 11. Holes 46 are provided in plate 39 to permit free flow of gases from igniter 23 along the inner wall of body portion 11 and thereby contacting of the exterior surface of grain 16. It is self-evident that other methods of supporting the resilient members may be devised, for example, individual metal portions just large enough to hold the resilient members. The side members may be readily attached to the interior of the body portion by adhesive when it is desired to use separate end members and side members.

At the end of the body portion 11 opposite that containing end-closure 21, there is a thin-walled screen-like member 51. This screen-like member 51 is adapted to be attached to the end of the body portion 11 opposite that wherein end-closure 21 is attached. In this embodiment, the attachment is made by means of snap-on means positioned on the end of body portion 11 and on the flange 52 of member 51. Figure 3 shows an enlargement of a particular snap-on. Here a recess 54 is formed into the end of the exterior wall of body portion 11. A projection 56 is formed into the inner side of the flange 52 of member 51. The member 51 is positioned so that the recess 54 and projection 56 correspond and the member 51 is locked on by a forceable blow against the flange causing 54 and 56 to snap fit. It is obvious that many other simple methods of attaching screen-like member 51 to body portion 11 may be devised by those skilled in the metal working art.

Screen-like member 51 is provided with a spacing element 61. Spacing element 61 provides a spring action which works against the bottom of the starter chamber to force the igniter assembly electrical contact point against the electrical connection positioned in the upper end of the chamber. In this embodiment, spacing element 61 consists of a spring 62 which is confined by a dome-like member 63 that is welded to the screen member 51. The other end of spring 62 is movably confined by cap 64 which, in this embodiment, makes the actual contact with the bottom of the starter chamber. Thus when the cartridge case is positioned in the starter chamber, cap 64 forces back spring 62 so that by compression of spring 62 the electrical outlet is tightly held against the electrical contact point of the upper end of the starter chamber. The spacing element 61 is preferably positioned at substantially the center of the screen-like member 51. It is to be understood that spacing element 61 may perform, in addition to the spacing function, a grounding function acting as an electrical conduit for the ignition circuit. Therefore, when spacing element 61 is acting also as a ground, it is necessary that it be made of an electrical contacting material.

Screen-like member 51 is provided with a multiplicity of holes 51a which extend through the wall of the member. These holes occupy substantially all of the portion of the member except for that taken up by the spacing element 61. The holes permit the substantially unobstructed flow of combustion gases from propellant 16 out of the cartridge case and on into the conduit leading to the starter turbine. In this regard, spacing element 61 also provides the necessary clearance between the bottom of the starter chamber and the case to form a passage permitting the flow of the combustion gases. The holes in screen member 51 are of a size such that any unburned lumps of propellant will be retained in the case until reduced to size which will not clog the conduit leading to the starter turbine. Screen member 51 is formed of material of sufficient thickness to impart the necessary strength to the member in view of the multiplicity of holes therein.

Resilient members are provided at the screen member end of the body portion to maintain the predetermined spacing between the inside wall of the body portion 11 and the cylindrical side of the grain 16. Also, the resilient members maintain a predetermined spacing between the screen member and the end of the grain 16. In Figure 1, lower resilient side member 71 and lower resilient end member 72 are shown. Actually in this embodiment four lower resilient side members and four lower resilient end members, in the form of an L-shaped piece of felt, are utilized. The lower resilient members may be made of the same type of material and be of the same construction as the upper resilient members. In this embodiment, the L-shaped lower resilient end members are not fastened to the wall of tubular body portion 11. The clearance between the screen member 51 and the end of grain 16 is such that the resilient members are held in place by pressure from the screen member 51 when it is locked on to the end of body portion 11. However, suitable means for fixedly attaching the lower resilient members may be readily devised.

In order to exclude moisture from entering the case by way of screen member 51, a moisture-impervious film 74 is placed over the open end of body portion 11 after the lower resilient members have been put into place. The film 74 extends not only over the open end but overhangs the sides of portion 11 and is crimped between the flange 52 of screen member 51 and the end of the body portion 11, as shown in Figure 3. Moisture-impervious film 74 is preferably made of a plastic or rubberized material which, while excluding moisture, will disintegrate substantially instantaneously when pressure is imposed on it by the combustion gases from the burning of grain 16. Film 74 may be made of a very thin metal such as aluminum foil, although it is preferred that a combustible film be used. Polyethylene film is particularly suitable.

The starter cartridge case contains an igniter assembly which comprises an ignition device and a fastening means. The igniter assembly 23 is shown in Figure 2. Details of a preferred embodiment are set out in Figures 4 and 5. It can be seen that igniter assembly 23 comprised of a shallow cup 81, is provided with a centrally located hole. Positioned in this hole are the necessary elements for the introduction of electrical current for the actuation of electrical squibs, insulation of the conducting elements from each other, and moisture-sealing the conducting elements. Means are provided for rigidly fastening the ignition cup and the associated electrical introduction means to the end-closure of the starter cartridge case.

The igniter assembly is described in detail in connection with Figures 4 and 5. In Figure 5, the igniter cup 81 is a shallow metal cup relatively wide in relationship to its depth. This relationship is in order to provide a burst of ignition gases covering a large portion of the end of starter grain 16 and also in order to reduce the total length of the starter cartridge case. The shell of the cup is turned over at the ends in order to strengthen the cup. There is centrally located in cup 81 a hole wherein the electrical conducting elements are positioned. Tubular bushing 82 is fitted in this hole. The end 83 of tubular bushing 82 is crimped over to form a tight fit between the metal of cup 81 and the bushing 82. An electrical conductor 84 is fastened to bushing 82 inside cup 81. In this instance, connection 84 is a copper washer and the connection is made by crimping the end 83 of bushing 82 over washer 84. A female clamp electrical terminal 86 is fastened on to washer 84 in order to provide a connection for the wires of an electrical squib. An electrical conducting rod 87 passes through the interior of bushing 82 and extends from the inside of cup 81 to a point somewhat beyond the outer end of said bushing to form an electrical contact point. In this embodiment, the end of rod 87 has been expanded to form a broad contact point 88. At the inside end of rod 87 there has been attached a female electrical clamp 89 to which the electrical leads of a squib are attached. The contact end 88 of conducting rod 87 is insulated from the interior of bushing 82 by means of an elastic moisture-impervious insulating means 91. Means 91 may be any elastic material which is not an electrical conductor and at the same time will prevent the ingress of moisture into the conduit formed by bushing 82. Silicone rubber is particularly suitable. A reinforcing and insulating washer 92 is positioned below insulating means 91 in the conduit formed by bushing 82. This insulating means may be a simple paper washer. Below washer 92 there is positioned about rod 87 in the conduit of bushing 82 a tubular insulating means preferably of silicone rubber as is element 91. This tubular element 93 insulates rod 87 from bushing 82. The contact end 88 of rod 87 is rigidly maintained in predetermined relation with the outer end of bushing 82 by a fastening means positioned about rod 87 inside the cup. In this embodiment, a washer 96 is forced against the crimped end of bushing 82 by means of fastener 97. Other means for maintaining the contact end at the predetermined position while insulating rod 87 from the lower end of the bushing 82 may be readily devised.

The ignition device comprising the cup and the electrical conducting means are rigidly attached to the hole provided in end-closure 21 in such a way that the contact point 88 is exposed beyond the outside wall of end-closure 21. In Figure 5, there is shown one means of having this fastening. In this embodiment, the outside of the portion of bushing 82 extending outside of shell 81 is threaded and the igniter assembly is fastened to end-closure 21 by means of nut 101. Nut 101 is also shown in Figure 2. It is preferable that some means of vibration-proof nut 101 be provided and in Figure 2 lock washer 102 is provided. The security of the igniter assembly may be further enhanced by having the radius of the curvature of cup 81 slightly greater than the radius of curvature of end-closure 21. Thus when the ignition device is fastened by means of nut 101 the curved portion of cup 81 is forced into conformity with the curvature of end-closure 21, thereby providing an almost vibration-proof fit between the igniter assembly and the end-closure.

In Figure 4, electrical squibs 103 and 104 are shown in position inside of cup 81. Cup 81, containing the squibs, is then filled with the particular igniter composition utilized in the specific embodiment of the starter cartridge. For example, the ignition composition may be some variety of black powder. It is necessary to close the end of cup 81 to keep the ignition composition in place and also to have a moisture-impervious protection for the ignition composition. A moisture-impervious film may be placed over the open end of cup 81 and then fastened by some fastening means passing around the rim 106 of cup 81. Another form of closure for cup 81 is made of moisture-impervious elastic material provided with a flange which snaps over rim 106 of cup 81. It is necessary that the moisture-impervious film closing beyond the cup 81 be held securely enough to avoid any slipping-off of the film during handling and also strong enough to avoid rupture of the film during handling. In the particular embodiment set out herein, the end of cup 81 is closed by means of a moisture-resistant paper 108 positioned over the open end of cup 81 and passing down the sides of the cup in an overlapping manner. Over the moisture-resistant paper is positioned an aluminum foil sheet 109 also overlapping the sides of the cup 81. The two-layer film is securely fastened to the cup by means of wire 111. Instead of wire 111, a circular spring may be used to securely clamp the film to the sides of the cup. To complete a moisture-impervious covering for cup 81, a moisture-resistant tape 112 is wrapped over wire 111 extending beyond the end of films 108 and 109.

The squibs 103 and 104 are actuated by an electrical impulse from the cockpit of the airplane. The electrical impulse is passed into the starter chamber, passes through contact point 88 into squibs 103 and 104. When the cartridge case is unpainted and is made of electrical conducting material, spacing element 61 serves as a ground; also, contact of the sides of the cartridge case with the interior of the chamber provides a ground. When the cartridge case is painted, as may be required for storage purposes, it is necessary to provide adequate grounding means for insuring proper firing of the squibs. In Figure 5, there is set out a particularly effective means for providing an electrical ground and also a safety device in the handling of the cartridge case prior to insertion in the chamber. This device is called a short-out clip and it comprises a curved portion 116 which extends over and is in spaced relation to contact point 88. The curved portion is then joined to the exterior of the bushing in a manner to form a good electrical contact. In this embodiment, a metal washer 117 provided with anti-vibration loosening teeth forms the contact between the curved portion 116 and the exterior bushing 82. In storage and handling, the tip 118 of the short-out clip prevents accidental electrical contact, for example, by the upper section of the chamber when the electrical switch is accidentally left on, with the contact point 88. When the cartridge has been introduced into the starter chamber, curved portion 116 is straightened somewhat by the person inserting the cartridge into the chamber, and tip 118 is set out in such a position that when the upper section of the chamber is closed, tip 118 is firmly touching the chamber wall and thereby provides a good electrical ground. Other means of grounding may readily be devised.

Thus having described the invention, what is claimed is:

1. A turbojet starter cartridge case comprising (1) a thin-walled tubular body portion provided with a shallow groove in the exterior of said body portion at about the mid-point thereof, and positioned in said groove a plurality of apertures substantially uniformly spaced about the periphery of said body portion, (2) a moisture-impervious film extending around the periphery of said body portion and covering the apertures provided in said groove, (3) an elastic ribbon-like member positioned in said groove and extending over the apertures provided therein, (4) a thin-walled end-closure means attached to one end of said body portion, which end-closure is adapted for the mounting of an igniter assembly and is provided with a plurality of apertures, said end-closure apertures being positioned to allow free-flow of gases from the interior of the case, (5) moisture-impervious film means covering the gas-flow apertures in said end-closure, (6) upper resilient side-members and upper resilient end-members supported near the end-closure means, which upper side-members are adapted to maintain a pre-determined spacing between the interior side of the body portion wall and the inner surface of said upper side-members and between the interior side of said end-closure wall and the inner surface of said upper end-members, (7) a thin-walled screen-like member adapted to be attached to the other end of said body-portion, said screen-like member being provided with a spring-like spacing element positioned substantially at the center of said screen-like member and projecting beyond the exterior side of the wall thereof, and a multiplicity of holes extending through the wall thereof, (8) moisture-impervious film means positioned so as to exclude moisture from entering the interior of said body portion by way of the end containing said screen-like member, and (9) lower resilient side-members and lower resilient end-members positioned near the screen-like member, which lower side-members are adapted to maintain a predetermined spacing between the interior side of the body portion wall and the inner surface of said lower side-members and between the interior side of said screen-like member and the inner surface of said lower end-members.

2. A turbojet starter cartridge case comprising (A) a thin-walled metal cylinder provided with a thin-walled convex metal end-closure means fixed at one end of said cylinder, said cylinder being provided with a shallow groove at about the mid-point thereof and with a number of circular apertures positioned substantially uniformly about the periphery of said cylinder and located in and about the mid-point of the groove, said apertures being small relative to the width of the groove, (B) a moisture-impervious tape extending around the periphery of said cylinder and covering the apertures in the groove, (C) a rubber-like elastic band positioned in the groove and extending over the apertures therein, said band being of about the width and depth of the groove, (D) an igniter assembly attached to said end-closure means, (E) said end-closure means being provided with a number of small apertures, positioned relative to said igniter assembly so as to permit free flow of gases from the interior of the case, (F) moisture-impervious tape covering the gas-flow apertures in said end-closure, (G) felt-like spacing members adapted to maintain a predetermined gap between the interior side of said cylinder and the outer surface of a cylindrical propellant grain, which grain is adapted to be contained by said case, (H) upper felt-like spacing members adapted to maintain a predetermined gap between the interior side of the end-closure means and the upper end of the grain adapted to be contained in said case, (I) a thin-walled metal screen-member provided with means for attaching said screen-member to the other end of said cylinder, said screen-member being provided with a multiplicity of holes extending through the wall thereof, (J) a spring-like spacing-member attached to the screen-member at about the center thereof and extending a predetermined distance beyond the exterior side of the screen-member, (K) a moisture-impervious membrane positioned over the other end of said cylinder so as to exclude moisture from the interior of said cylinder, and (L) lower felt-like spacing members adapted to maintain a predetermined gap between the interior side of said screen-member and the lower surface of the grain adapted to be contained in said case.

3. An igniter assembly adapted for use in a turbojet starter cartridge comprising (a) an ignition device comprising (1) a shallow cup provided with a centrally located hole, (2) a tubular bushing fitted in said hole, (3) an electrical conductor joined in said bushing inside the cup, (4) means for joining said bushing substantially rigidly to said cup, (5) an electrical conducting rod passed through the inside of said tubular bushing with one end forming a contact point which projects somewhat beyond the outer end of said bushing and the other end extending into said cup, (6) a first elastic, moisture-impervious insulating means separating the contact end of said rod from said bushing, (7) a thin fibrous washer positioned about said rod below said first insulating means, (8) a tubular elastic second insulating means positioned about said rod below said washer and separating said rod from said bushing and said electrical conductor, (9) rigid insulating means adapted for fixedly maintaining the contact end of said rod in predetermined relation with the outer end of said bushing, and (b) means for rigidly fastening said ignition device to an end-closure of a turbojet starter cartridge with the bushing and contact point extending externally beyond the end-closure wall.

4. The assembly of claim 3 wherein said device is provided with means adapted for covering the open end of said cup, which means are easily removed by action of the hot gases from the ignition composition to be contained within said cup, which composition is ignited by the action of electrical squibs joined to said conductor and said rod.

5. The assembly of claim 3 wherein the fastening means (b) includes a metal short-out clip consisting of a curved portion extending over the contact end of said electrical conducting rod and means for joining said curved portion to said bushing to make an electricity conducting joint, which curved portion is adapted for easy straightening.

6. The assembly of claim 4 wherein said covering means consists of a moisture-resistant paper covering placed over the open end of said cup, and extending over the sides of said cup, aluminum foil covering placed over said paper covering and extending over the sides of said cup, wire-like means securely fastening said paper cover and said foil cover to the side of said cup and moisture-impervious tape positioned on the side of said cup to cover said wire-like means and the edge of said coverings producing a moisture-resistant seal.

7. A turbojet starter cartridge case comprising (a) a thin-walled tubular body portion provided with a shallow groove in the exterior of said body portion at about the mid-point thereof, and positioned in said groove a plurality of apertures substantially uniformly spaced about the periphery of said body portion, (b) an elastic ribbon-like member positioned in said groove and extending over the apertures provided therein, (c) a thin-walled end-closure means attached to one end of said body portion, which end-closure is adapted for the mounting of an igniter assembly and is provided with a plurality of apertures, said end-closure apertures being positioned to allow free-flow of gases from the interior of the case, (d) upper resilient side-members and upper resilient end-members supported near the end-closure means, which upper side-members are adapted to maintain a pre-determined spacing between the interior side of the body portion wall and the inner surface of said upper side-members and between the interior side of said end-closure wall and the inner surface of said upper end-members, (e) a thin-walled screen-like member adapted to be attached to the other end of said body-portion, said screen-like member being provided with a spring-like spacing element positioned substantially at the center of said screen-like member and projecting beyond the exterior side of the wall thereof, and a multiplicity of holes extending through the wall thereof, (f) lower resilient side-members and lower resilient end-members positioned near the screen-like member, which lower side-members are adapted to maintain a predetermined spacing between the interior side of the body portion wall and the inner surface of said lower side-members and between the interior side of said screen-like member and the inner surface of said lower end-members.

No references cited.